(12) United States Patent
Jackson, Sr.

(10) Patent No.: US 11,604,046 B2
(45) Date of Patent: Mar. 14, 2023

(54) STEADY SHIELD

(71) Applicant: Marc Jackson, Sr., Riverside, CA (US)

(72) Inventor: Marc Jackson, Sr., Riverside, CA (US)

( * ) Notice: Subject to any disclaimer, the term of this patent is extended or adjusted under 35 U.S.C. 154(b) by 0 days.

(21) Appl. No.: 17/565,413

(22) Filed: Dec. 29, 2021

(65) Prior Publication Data

US 2022/0276025 A1 Sep. 1, 2022

Related U.S. Application Data

(60) Provisional application No. 63/136,043, filed on Jan. 11, 2021.

(51) Int. Cl.
| | | |
|---|---|---|
| *F41H 5/08* | (2006.01) | |
| *F16M 13/04* | (2006.01) | |
| *F41H 5/18* | (2006.01) | |
| *F41H 5/26* | (2006.01) | |

(52) U.S. Cl.
CPC ............. *F41H 5/08* (2013.01); *F16M 13/04* (2013.01); *F41H 5/18* (2013.01); *F41H 5/26* (2013.01)

(58) Field of Classification Search
CPC .... F41H 5/08; F41H 5/18; F41H 5/26; F16M 13/04
USPC ............ 89/36.01, 36.02, 36.03, 36.05
See application file for complete search history.

(56) References Cited

U.S. PATENT DOCUMENTS

| | | | |
|---|---|---|---|
| 1,004,850 A | 10/1911 | Cogil | |
| 3,370,302 A | 2/1968 | Karlyn | |
| 4,859,184 A | 8/1989 | Hazard | |
| 6,098,196 A | 8/2000 | Logan | |
| 7,716,748 B2 * | 5/2010 | Dovner | F41C 33/0209 89/36.01 |
| 7,798,878 B1 | 9/2010 | Lee | |
| 8,408,114 B1 * | 4/2013 | Tan | F41H 5/08 89/36.02 |
| 10,281,244 B2 | 5/2019 | Spransy et al. | |
| 2010/0083820 A1 * | 4/2010 | Doyner | F41H 5/08 89/36.02 |
| 2013/0098234 A1 * | 4/2013 | Armellino, Jr. | F41H 5/08 89/926 |
| 2014/0014700 A1 * | 1/2014 | Gill | A45F 3/08 224/637 |
| 2015/0233679 A1 * | 8/2015 | Seabrook | F41A 27/10 89/36.07 |
| 2017/0102215 A1 * | 4/2017 | Castrati | A45F 3/14 |
| 2018/0202771 A1 * | 7/2018 | Armellino, Jr. | F41H 5/08 |

FOREIGN PATENT DOCUMENTS

WO WO-2020076253 A1 * 4/2020 ............... F41H 1/02

* cited by examiner

*Primary Examiner* — John Cooper
(74) *Attorney, Agent, or Firm* — Kirk A. Buhler; Buhler & Associates

(57) ABSTRACT

Improvements in a shield is disclosed. The steady shield integrates a vest with a shield that can be made from a protective ballistic material that protects the user from projectiles, bottles, heat or debris. An adjustable arm connects the vest to the shield and allows the shield to be moved at least one of towards, away and to the sides and higher and lower relative to the user. Once the shield is positioned the shield will remain in the set position to allow both arms and hands of the user free for other activities. The shield also provides a platform for the storage of tools or other features such as, but not limited to, ammunition, tear gas, water, first aid, lighting, radio, camera, GPS or other display.

20 Claims, 3 Drawing Sheets

STEADY SHIELD

CROSS REFERENCE TO RELATED APPLICATIONS

This application claims the benefit of Provisional Application Ser. No. 63/136,043 filed Jan. 11, 2021, the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in protective shield. More particularly, the present steady shield creates a defense shield that is mounted to a vest through an adjustable arm so the position of the shield can be maintained without requiring the shield to be held by the user.

Description of Related Art Including Information Disclosed Under 37 CFR 1.97 and 1.98

Law enforcement and fire fighters and others need to use a shield in a variety of settings for protection. Typically, the shield is held by one arm of the user as they move about. In other cases, the shield is located at a fixed location on a vest or on a headband. When the shield is held in an arm, carrying the shield gives the arm that is carrying the shield limited ability. When the shield is mounted to a headband the fixed location of the shield provides only protection where the shield is located. In all these embodiments the function of the shield either limits the use of a limb or provides protection from only one fixed side of the user.

A number of patents and or publications have been made to address these issues. Exemplary examples of patents and or publication that try to address this/these problem(s) are identified and discussed below.

U.S. Pat. No. 3,370,302 issued on Feb. 25, 1966, to A. A. Karlyn and is titled Protective Shield Assembly. This patent discloses protective devices, and more particularly to a transparent protective shield assembly for use by an individual to ward off bodily injury. While this patent provides a protective shield, the shield is held by an arm of a person and limits the use of the arm.

U.S. Pat. No. 6,098,196 issued on Aug. 8, 2000, to Michael Logan and is titled Body Armor. This patent discloses an extendable neck/face protecting ballistic shield attached to a ballistic vest for rapid deployment between storage and neck/face protecting positions. While the shield in this patent extends from a vest, the location of the shield is fixed in relationship to the vest.

U.S. Pat. No. 7,798,878 issued on Sep. 21, 2010, to Bobby Lee and is titled Personal Windscreen Apparatus. This patent discloses a personal windscreen apparatus is mounted on a boater's body to protect a boater's face during boating. The apparatus has a windscreen secured to a flotation device. The flotation device is secured to a boater's body utilizing a series of straps. While this patent provides a shield the location of the shield is fixed.

What is needed is a shield that extends from a vest and the position of the shield is movable relative to the vest and the shield remains in the set position. The proposed steady shield provides the solution with the shield that is secured to a vest with an arm that allows the position of the shield to be set and allows both arms and hands of the user free.

BRIEF SUMMARY OF THE INVENTION

It is an object of the steady shield to provide a shield that protects the used from objects that are launched, thrown or in proximity of the user. The shield can be made from a protective ballistic material that protects the user from projectiles, bottles or debris. The shield can also be made from a thermal reflective material that provides protection from a fire or hot environment. The shield can be flat curved or otherwise contoured to provide some wrap-around protection for the user. The shield may be constructed with a hybrid material with different materials from above and below a line-of-site of a user.

It is an object of the steady shield to be integrated to a vest. The vest provides a semi-rigid or exoskeleton structure that can support the shield. In addition to the structural integrity, the vest can also be constructed from ballistic resistant material so the user can have protection from other areas that are not behind the shield. In many cases, a law enforcement professional would normally wear a bullet-proof-vest when they are in a hostile environment. The vest with the shield could have similar material and structural characteristics. The additional structure prevents the shield from drooping and transfers the cantilevered load of the shield evenly to the vest and torso of the user. This reduces arm fatigue from the user carrying the shield.

It is another object of the steady shield to have an adjustable arm between the vest and the shield. The adjustable arm allows the shield to be moved at least one of towards, away and to the sides and higher and lower relative to the user. Once the shield is positioned the shield will remain in the set position to allow both arms of the user free for other activities. The shield can be placed to a side as the user progresses forward to provide protection from a side where the user is not looking. The shield can be separable from the vest at one or both sides of the arm to provide a way to quickly install and remove the shield when needed. The shield can be stored in a trunk of a vehicle or at a similar location to a bullet-proof-vest. It allows the user to use both hands for shooting and changing ammunition.

It is still another object of the steady shield to provide a platform for the storage of tools or other features such as, but not limited to, ammunition, tear gas, water, first aid, lighting, radio, camera, GPS or other display. The tools can be interchanged or swapped based upon the situation. The user and their vest have limited storage area and the shield further expands the places that a user has available.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
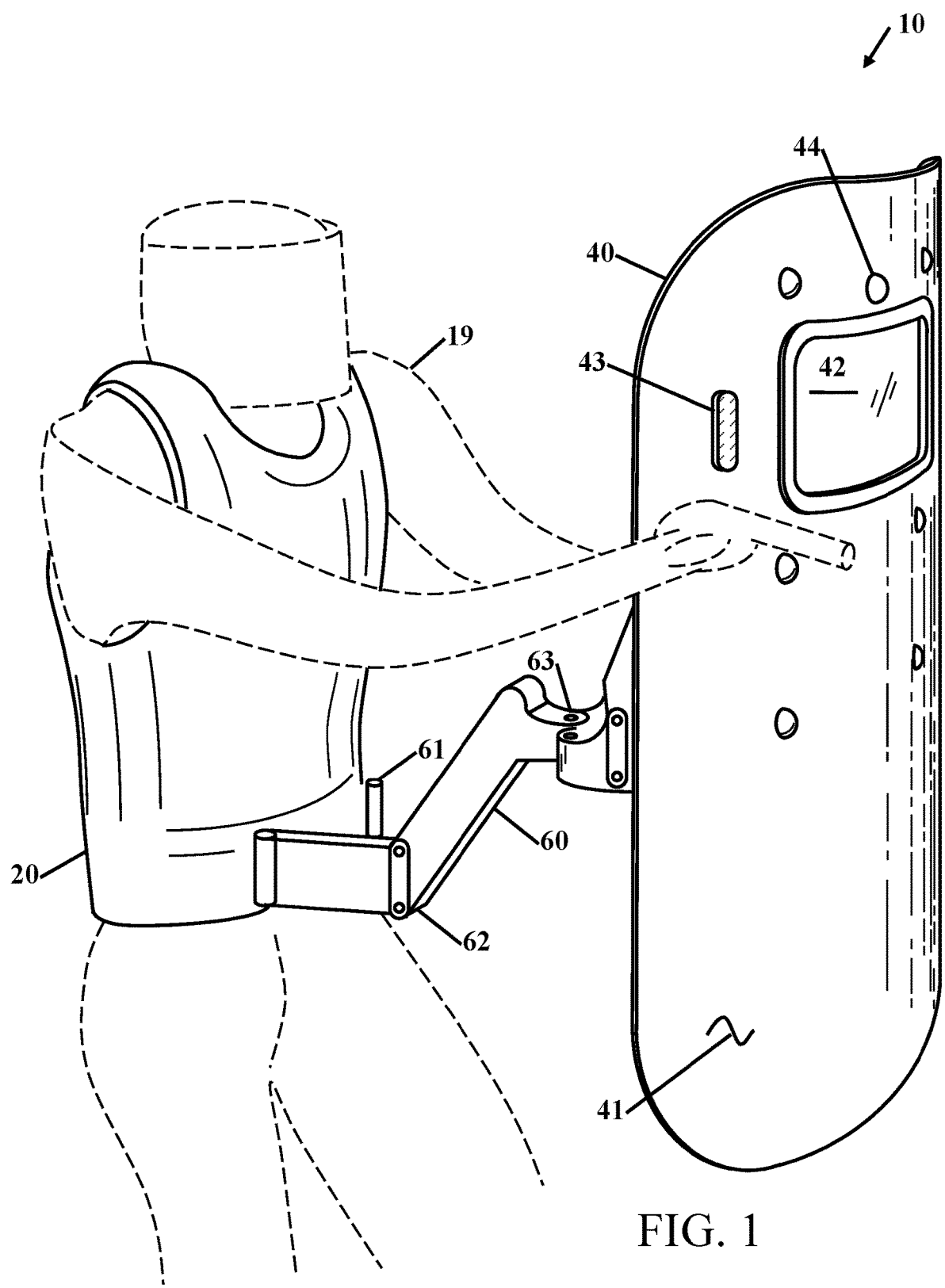
FIG. 1 shows a front perspective view of a person using a steady shield.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

| Item Numbers and Description | |
|---|---|
| 10 steady shield | 19 user |
| 20 vest | 21 arm opening |
| 22 side buckle | 23 head opening |
| 24 shoulder buckle | 30 |
| 40 shield | 41 front |
| 42 window | 43 light |
| 44 camera | 45 shield mount |
| 46 screen | 47 clip(s) |
| 48 gas | 50 51 |
| 60 mid arm | 61 vest mount |
| 62 first elbow | 63 second elbow |
| 64 front arm | 65 spring |
| 70 chest mount | 71 chest angle adjust |
| 72 first arm | 73 middle hinge |
| 74 second arm | 75 shield mount |
| 97 side angle | 98 vertical tilt |
| 99 horizontal | |

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing embodiments only and is not intended to be limiting of the technology. As used herein, the singular forms "a," "an," and "the" are intended to include the plural forms as well, unless the context clearly indicates otherwise.

It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters.

FIG. 1 shows a front perspective view of a person or user 19 using a steady shield. The user 19 is shown in broken lines with the user wearing a face shield with a firearm. The steady shield 10 is mounted onto the user 19 with a vest 20. The vest 20 has a similar structure to a bullet-proof-vest that protects the user 19 from projectiles. The vest 20 provides personal armor that helps absorb the impact and reduce or stop penetration to the body from firearm-fired projectiles. The vest 20 provides a structure or exoskeleton that distributes to load of the steady shield 10 around the torso of the user 19. In this embodiment the steady shield 10 has at least one vest mount 61 that connects to an arm assembly to the shield 40. The arm can be moved from quickly installed and removed from the vest mount 61 to favor the steady shield 10 to either preferred side of the user 19.

A shield 40 can typically weigh between 20 and 40 pounds and provides a larger area of protection to the user 19 including the user's arms, neck waist and lower area. The shield 40 is made from a penetration-resistant, energy-dispersing ballistic plate, covered by a lightweight, projectile absorbing metal alloy skin that is bullet proof/bullet resistant. The shields 40 from multiple users can be interconnected or nested to provide a larger area of protection. The height of the shield is sufficiently sized to allow the user 19 to kneel behind the shield to provide complete frontal protection. The connection between the vest 20 and the shield 40 provides a structural compliant connection that allows the user 19 to move or position the shield 40 and the shield will remain in the set position.

The position can be to a side, and/or tilted up or down in addition to positioning the shield 20 closer or further from the user 19. In this re-positional connection arm embodiment, the arm is constructed with a mid-arm 60 between a first elbow 62 and a second elbow 63. Once the shield 40 is set in the desired position the user 19 is no longer required to hold the shield 40 and has both arms and hands free while the shield 40 provides protection from the front, side, above or below the user 19. The user 19 can continue to change or set the location of the shield 40 at any time and the shield 40 will remain in the adjusted position relative to the vest 20.

The shield 40 in this figure has window 42 so the user can view through at least a portion of the shield 40. The user typically will shoot around the side of the shield, as shown in this figure. This shield is also shown with lighting 43 and with a camera 44 that illuminates an area in front of the front 41 of the shield and can record images. The lighting 43 can be a variety of lighting including, but not limited to, infrared or for night vision. The images can be transmitted, recorded or shown on a screen on the inside of the shield, as shown in other figures herein. The camera 44 can provide thermal imaging and/or night vision to aid the user 19 as they progress through a situation. The camera can be a stead camera that filters movement of the shield.

Figure 2:
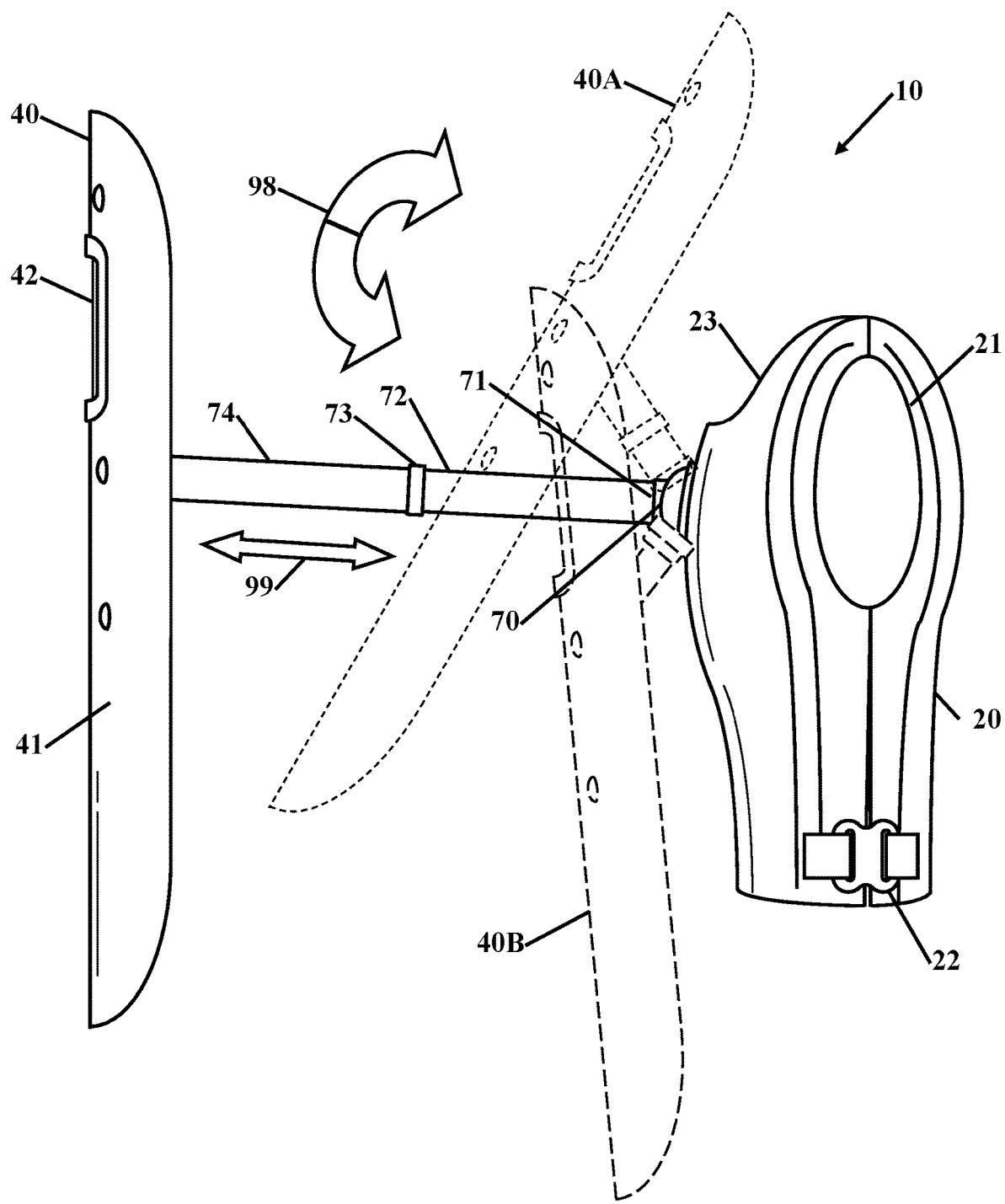
FIG. 2 shows a side view of the steady shield.

FIG. 2 shows a side view of the steady shield 10. In this figure the shield 40 is shown in solid line at the furthest horizontal 99 extension from the vest 20. This side view shows the arm opening(s) 21, the head opening 23 along with a side buckle 22 that is adjustable to secure the vest 20 on and around the user. This configuration may be used in a fire protection mode where the front 41 of the shield 40 is near a heat source where the user can view the heat source through the window 42. The shield 40 can be constructed from a material that will block thermal heat.

This embodiment shows an arm that joins into the vest 20 in the central chest area and has a first arm 72 that connects with a chest mount 70 to the vest 20. The chest mount 70 has a chest angle adjustment that allows the angle or vertical tilt 98 of the shield 40 to be adjusted above the user from an elevated shield 40A to a lower angle shield 40B. While the chest angle adjusts 71 allows the angle of the or vertical tilt 98 to be made the displacement horizontal 99 distance from the vest 20 to the shield 40 is also adjustable. The vest 20 provides a structure or exoskeleton that distributes to load of the shield on the arm around the torso of the user. In this embodiment the steady shield 10 has a chest mount 70 that connects to an arm assembly to the shield 40.

The arm is constructed from multiple elements with a first arm 72 that connects to the chest angle adjust 71 at a first end and with a middle hinge 73 at a second end. There is also a second arm 74 that connects at a first end at the middle hinge 73 and at a second end at the inside of the shield 40. The two arms 72 and 74 hinge at their respective connections to the vest 20 or shield 40 with hinge connections that allow the two arms 72 and 74 to move the shield 40 towards and away from the vest 20 to provide a greater distance from a threat, at the furthest extension, to providing a more wrapped protection in a closer position of the shield 40 to the vest 20.

Figure 3:
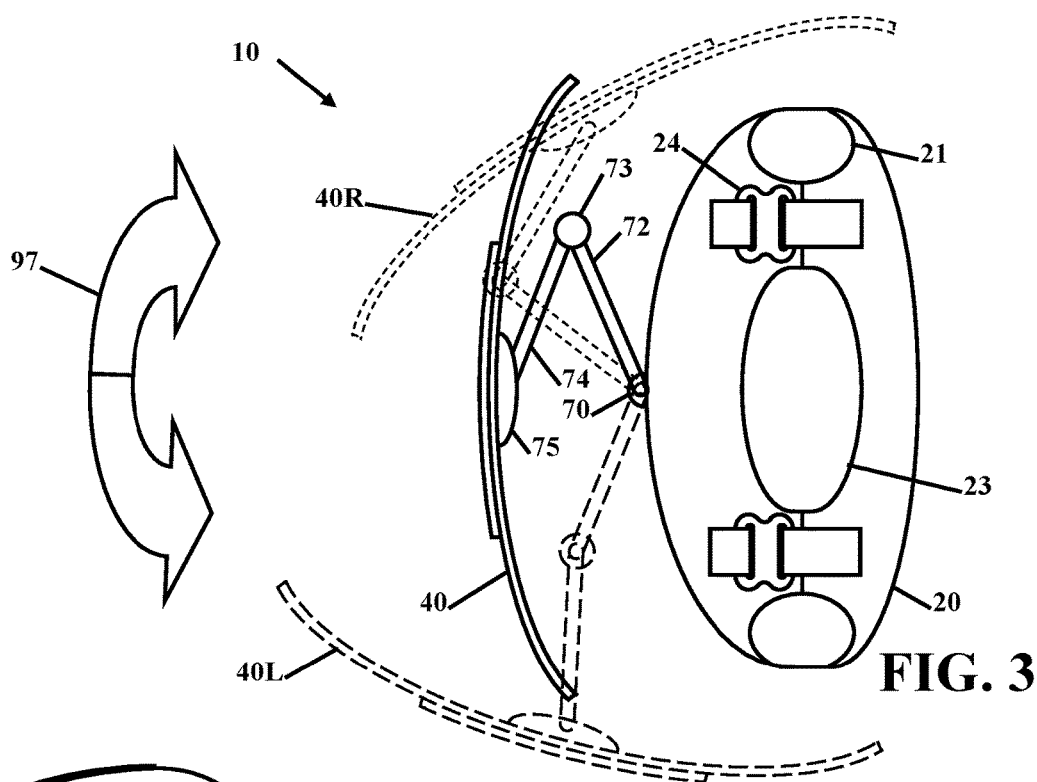
FIG. 3 shows a top view of the steady shield.

FIG. 3 shows a top view of the steady shield 10. In this figure, the shield 40 is shown using the arm to position the shield 40 to the right of the vest 20 as 40R and to the left of the vest 20 as 40L. The multiple hinge elements 70, 73 and a hinge connection with the shield mount 75 of the arm having a first arm 72 that connects to the chest angle adjust 71 at a first end and with a middle hinge 73 at a second end. There is also a second arm 74 that connects at a first end at the middle hinge 73 and at a second end at the inside of the shield 40 at a shield mount 75. The two arms 72 and 74 hinge at their respective connections to the vest 20 or shield 40 with hinge connections that allow the two arms 72 and 74 to swing for re-positioning the shield 40 for side angle(s) 97.

A side angle of protection allows a user to protect their side from an unknown attacker as the user progresses forward (or backward) in a hostile environment while the user focuses on in front of them or to the non-shielded side. Regardless of the position of the shield around the user, both arms of the user are free. This top view shows contemplated shoulder buckle(s) 24 with the arm openings 21 and the head opening 23.

Figure 4:
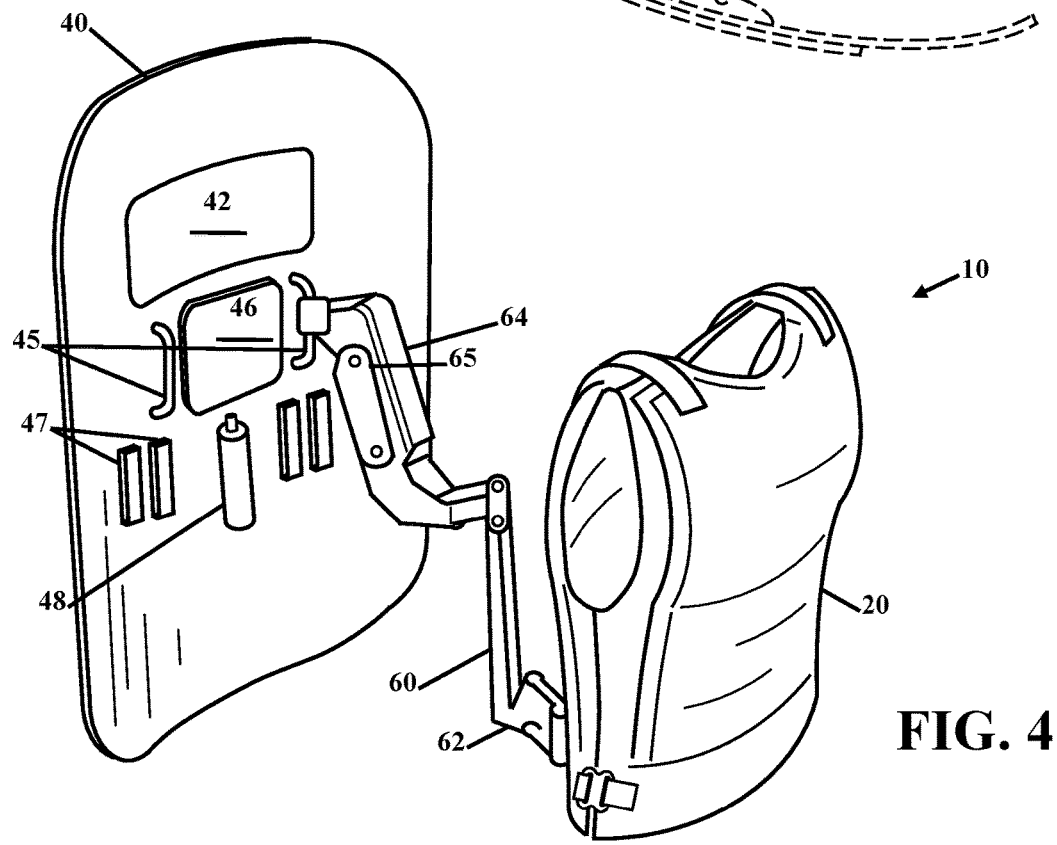
FIG. 4 shows a rear perspective view of the steady shield.

FIG. 4 shows a rear perspective view of the steady shield 10 with the connection from the rear of the shield 40 on one shield mount 45. The front arm 64 is shown connected to one of the shield mounts 45 that are located above the centerline of the steady shield 10. The front arm 64 may have springs 65, friction surfaces or other features operate as a counter-balance to offset the weight of the shield 40. The front arm 64 is shown connecting through the mid arm 60 to the first elbow 62 on the vest 20. The combination of connecting arms allows the shield 40 to be positioned towards and away from the vest 20. The connections between the shield 40 and arm and the vest 20 and arm allows the user to rotate the shield 40 relative to the vest 20.

The rear of the shield can provide additional storage of items such as, but not limited to, including ammunition clips 47 and tear gas 48, radio or other offensive or defensive items. This figure shows a screen 46 on the back of the shield 40. The screen 46 can be used to get images of a suspect, thermal imaging, a map, GPS or silent communication. Each shield 40 can be Geo tracked to monitor a location of each user and for a person to locate a steady shield 10. While not shown the screen 46 can also have a camera that faces the user so images of the user can be seen or shared with command and other team members using a wireless link. While this is shown being used with a law enforcement user 19, the same apparatus can be useful in crowd control and fire-fighting or other situations where a shield would be held by a person. The shield 40 can also be used for rescue and exit.

Thus, specific embodiments of a steady shield have been disclosed. It should be apparent, however, to those skilled in the art that many more modifications besides those described are possible without departing from the inventive concepts herein. The inventive subject matter, therefore, is not to be restricted except in the spirit of the appended claims.

SEQUENCE LISTING

Not Applicable.

The invention claimed is:

1. A steady shield comprising:
a vest that is configured to be worn on the torso of a user;
an adjustable arm mounted to the vest;
said adjustable arm having a horizontal arm with a first side that connects to said vest;
said first side of said horizontal arm having a vertical pivoting axis;
a second side of said horizontal arm having a horizontally pivoting connection to a second arm at a first side of said second arm;
a second side of said second arm having a second horizontally pivoting connection to a first side of a third arm;
at least one spring between said horizontal arm and said third arm that is configured to counterbalance a weight of a shield;
a second side of said third arm having a vertical pivoting connection to said shield mounted to said adjustable arm, and
said adjustable arm having at least one frictional link that retains said shield in an adjustable fixed position relative to said vest.

2. The steady shield according to claim 1, wherein said shield is configured to be positioned towards, away, from a side, higher and lower relative to said vest.

3. The steady shield according to claim 1, wherein said two vertical pivoting connections hinged links are configured to move said shield left, right, towards and away from said vest.

4. The steady shield according to claim 1, wherein said two horizontal pivoting connections are configured to allow for lifting and lowering said shield up and down relative to said vest.

5. The steady shield according to claim 1, wherein said vest has an exoskeleton that is configured to distribute loads on said adjustable arm to said vest.

6. The steady shield according to claim 1, wherein said shield has a window.

7. The steady shield according to claim 1, wherein shield has at least one light.

8. The steady shield according to claim 1, wherein shield has a camera.

9. The steady shield according to claim 8, further includes a display screen.

10. The steady shield according to claim 1, wherein said shield has storage for at least one gas canister.

11. The steady shield according to claim 1, wherein said at least one frictional link is adjustable for frictional resistance.

12. The steady shield according to claim 1, wherein said vest further includes a structure that is configured to mount over shoulders of a user.

13. The steady shield according to claim 1, wherein said shield is constructed from bullet proof or bullet resistant material.

14. The steady shield according to claim 1, wherein said shield is constructed from penetration-resistant, energy-dispersing ballistic plate, covered by a lightweight, projectile absorbing metal alloy skin.

15. The steady shield according to claim 1, wherein said at least one frictional link allows said shield to be set and retained in at least two positions relative to said vest.

16. The steady shield according to claim 1, wherein shield is curved to at least partially wraparound said vest.

17. The steady shield according to claim 1, wherein said shield is removable from said adjustable arm.

18. The steady shield according to claim 1, wherein said adjustable arm is removable from said vest.

19. The steady shield according to claim 1, wherein said at least two horizontal pivoting connections are independent and is configured to allow for rotating said shield relative to said vest.

20. The steady shield according to claim 1, wherein a said vertical pivoting connection to said shield is above a centerline of said shield.

\* \* \* \* \*